United States Patent [19]
Messenger

[11] 3,987,855
[45] Oct. 26, 1976

[54] LOST CIRCULATION CONTROL
[75] Inventor: Joseph U. Messenger, Dallas, Tex.
[73] Assignee: Mobil Oil Corporation, New York, N.Y.
[22] Filed: Nov. 25, 1974
[21] Appl. No.: 526,890

[52] U.S. Cl. ................................. 166/294; 175/65; 252/8.5 M
[51] Int. Cl.² .................... E21B 21/04; E21B 33/13
[58] Field of Search .................. 166/285, 292, 294; 175/65; 252/8.5 M

[56] References Cited
UNITED STATES PATENTS

| | | | |
|---|---|---|---|
| 2,350,154 | 5/1944 | Dawson et al. | 252/8.5 M |
| 2,393,173 | 1/1946 | Larsen | 166/292 |
| 2,607,731 | 8/1952 | Fischer | 252/8.5 M |
| 2,900,337 | 8/1959 | Earley | 252/8.5 M |
| 3,099,624 | 7/1963 | Wilson | 252/8.5 M |
| 3,490,535 | 1/1970 | Messenger | 166/292 |
| 3,724,564 | 4/1973 | Messenger | 175/72 |

*Primary Examiner*—James A. Leppink
*Attorney, Agent, or Firm*—C. A. Huggett; Henry L. Ehrlich

[57] ABSTRACT

This specification discloses a method of controlling an active zone that is penetrated in the drilling of a well. In accordance with the method there is formed a mixture of inert particulate material and an oil-wetting dispersing agent in a light oil and the mixture is circulated to a lower portion of the well and maintained there to allow the inert particulate material to separate from the light oil and form a plug in the well to control the active zone.

9 Claims, No Drawings

LOST CIRCULATION CONTROL

BACKGROUND OF THE INVENTION

This invention relates to the drilling of a well into the earth and more particularly to treating the well to form a plug therein to control an active zone penetrated by the well.

In the drilling of a well into the earth, there is commonly employed a drill string having a drill bit connected to the lower end thereof. The drill string is rotated to rotate the drill bit and form a well or wellbore in the earth by cutting and breaking the earth formation which it contacts. Drilling fluid is conventionally circulated down the drill string and through ports provided in the drill bit and back to the surface through the annulus formed between the drill string and the wall of the well. The circulating drilling fluid performs numerous functions including removing the cuttings from the well, cooling the bit, and applying hydrostatic pressure upon the penetrated earth formation to control fluids contained under pressure therein. "Drilling muds" having either an oil base or a water base are commonly utilized as drilling fluids. These drilling muds are normally treated to provide desired density and rheological properties which make them particularly suitable for use in drilling wells. For example, drilling muds may be treated to increase the density thereof by adding thereto such materials as barium sulfate (barite), lead sulfide (galena), and iron oxide (hematite).

In the drilling of a well, a high pressure formation commonly referred to as an over-pressured formation is sometimes penetrated which contains formation fluids such as oil, gas and water under unusually high formation pressure. When the formation pressures exceed the mud column pressure in the well the formation fluids will flow into the well and push the mud from the well. Such a flow of formation fluids into the well is commonly called a "kick". If the kick is not controlled for example by closing blowout preventers provided in the drilling equipment to shut in the well, the formation fluids will push all of the mud from the well (blow out). After closing the blowout preventer, if the formations exposed to the well stand the kick the well may be brought under control by increasing the density of the drilling mud in the well to increase the hydrostatic pressure of the mud column to an amount sufficient to control the flow of fluids from the high pressure formation into the well. After increasing the density of the drilling mud, drilling operations may be continued and the well extended further into the earth.

Oftentimes in the drilling of a well, a weak formation commonly referred to as a "lost circulation zone" is penetrated by the well. This formation may be an active lost circulation zone into which unacceptably large amounts of drilling fluid are lost or may be a potential lost circulation zone. The active lost circulation zone may be treated to reduce the loss of drilling fluids thereinto to an acceptable level and drilling of the well may be continued. The potential lost circulation zone may or may not be recognized as it is penetrated by the wall. However, when an active zone is penetrated at a deeper level of the well and the well is shut in to prevent a blowout, the increased pressure due to formation fluids entering the well may result in breaking down the lost circulation zone such that drilling fluids are lost into the lost circulation zone and the active zone blows out underground into the lost circulation zone. Such conditions where a well simultaneously kicks and loses circulation are very dangerous.

In such a situation it may be desirable to place a plug in the well to control the active zone. In U.S. Pat. No. 3,490,535 to Joseph U. Messenger there is described a method of placing a plug within a well. An aqueous suspension of a weighting agent containing a water-soluble complex phosphate thinning agent in an amount within a range of 0.2 to 0.9 pound per barrel of water and exhibiting a pH within a range of 6 to 11 is circulated down a drill string within the well and into the wellbore externally of the drill string. Thereafter the drill string is withdrawn and the suspension is allowed to settle and form a plug which is resistant to high pressure differentials thereacross. Such a plug may be useful for controlling an active zone that is penetrated by a well wherein a lost circulation zone overlies the active zone. Another instance when it may be desirable to form a plug in a well is in conjunction with the making of a "trip", i.e. the withdrawal of the drill string from the well in order to change the drill bit. In making the trip, the well may be inadvertently swabbed as the drill string is withdrawn from the well with the attendant result that the hydrostatic head on the bottom of the hole is suddenly lowered. It may therefore be desirable to place a plug near the bottom of the hole before starting the trip such that should a swabbing action take place the possibility of a well blowout will be greatly reduced.

SUMMARY OF THE INVENTION

In accordance with this invention there is provided a method of treating a well having a drilling fluid therein to form a plug therein to control an active zone penetrated by the well. There is formed a pumpable slurry of a light oil, a weighting agent, and an oil-wetting dispersing agent in an amount sufficient to cause the weighting agent to settle from the slurry, which slurry has a density of at least 18 pounds per gallon. The slurry is circulated down a drill string positioned in the well and into the well in the vicinity of the active zone. The drill string is raised above the slurry and the slurry is maintained in the well in the vicinity of the active zone to form a plug of the weighting agent in the well to control the active zone.

DESCRIPTION OF THE PREFERRED EMBODIMENTS

This invention provides a method of treating a well to control an active zone that is penetrated in the drilling of the well.

In accordance with this invention there is formed a pumpable slurry of a light oil, an inert particulate weighting agent in an amount sufficient to provide a slurry density of at least 18 pounds per gallon, and an oil-wetting dispersing agent in an amount sufficient to provide for the settling of the weighting agent from the slurry. The slurry is circulated down the well and into the vicinity of the active zone and maintained there is sufficient length of time to allow a plug to form of the weighting agent. The mechanism by which the plug is formed is considered to be by settling of the weighting agent, or by loss of oil filtrate into the active zone, or by a combination of these two mechanisms.

The light oil used in this invention may be any light oil which has characteristics that allow it to be handled at rig sites and pumped down the well and that allow it to serve as a carrier for the weighting agent. Typical light oils which may be used are diesel oils and kerosene. Diesel oil is commonly available at rig sites during the drilling of wells and is a preferred light oil for use in carrying out this invention. Hereafter this invention will be described primarily with reference to diesel oil though it is to be understood that other light oils likewise may be used.

The weighting agents employed in carrying out the present invention may be any weighting agents suitable for use in drilling muds. Examples of such weighting agents are barium sulfate, commonly called barite, which has a specific gravity of about 4.3; lead sulfide, commonly called galena, which has a specific gravity of about 7.4; and iron oxide, commonly called hematite, which has a specific gravity of about 5.0. The particle sizes of the weighting agents should be such that the weighting agents may be suspended in the light oil but will settle upon the inclusion of a sufficient amount of an oil-wetting dispersing agent in the suspension. The sufficient amount of oil-wetting dispersing agent required to bring about the settling of the weighting agent will vary somewhat upon the light oil being used and the weighting agent and size thereof. Barite is a weighting agent which is commonly available at rig sites during the drilling of wells and is a preferred weighting agent for use in carrying out this invention. Therefore, this invention will be described hereafter primarily with reference to barite though it is to be understood that other weighting agents that are essentially inert particulate materials likewise may be used. Experimental work (discussed later) has shown that a plug in a well and from which the barite will settle to form a plug.

This invention is particularly applicable for use in treating wells wherein oil base drilling muds are in use inasmuch as the slurry of this invention is compatible with the oil base drilling mud. Oil base drilling muds are commonly used in wells in which it is undesirable to use water base drilling muds because of adverse effects of water upon formations contacted by the well. Thus, in such wells wherein oil base drilling muds are in use the injection into the drilling mud of an aqueous fluid is undesirable because of the adverse effects that the aqueous fluid may have on formations penetrated by the well. No such adverse effects are experienced when the method of this invention is used in wells having oil base drilling muds therein.

The method of this invention is also applicable for treating wells which contain water base drilling muds therein. The slurry of this invention is immiscible with water and with water base drilling muds. This immiscibility of the slurry with the water base drilling muds enables the slurry to be placed in a desired position in the well with very little water contamination. This immiscibility characteristic is very important when this invention is used to control a salt water kick (flow of salt water in the well). Because the slurry is immiscible with water it may be placed in the well with very little if any dilution or contamination by the flow of salt water into the well, thus enabling a plug to be formed by the method of this invention to control the flow of salt water into the well.

TABLE I

DISPERSANT DESCRIPTION

| Trade Name of Dispersant | Distributor | Chemical Composition | Density lb/gal | Amount Required in Plug lb/final bbl |
|---|---|---|---|---|
| SE-11 | Magcobar | Modified alkyl aryl sulfonate plus imidazolin | 7.83 | 1 |
| EZ-Mul | Baroid | Half amide salt terminated | 8.1 | 2 |
| Driltreat | Baroid | Lecithin | 8.7 | 2 |
| Ken-Thin | Imco | Imidazolin | 7.9 | 2 |
| SA-47 | Oil Base, Inc. | Aryl alkyl sodium sulfonate | 8.12 | 2 |
| Carbo-Mul | Milchem | Oil-soluble alkanol amide | 7.5 | 4 |
| Surf-Cote | Milchem | Oil-soluble amine dodecyl benzene sulfonate | 8.16 | 4 |
| Fazethin | Magcobar | | | 1 | almost no settling of barite takes place from a 21-pound slurry of diesel oil, barite, and dispersing agent when the dispersing agent is present in the slurry in an amount of about one pound or less per barrel (lb/bbl) of slurry.

The oil-wetting dispersing agents employed in carrying out the present invention may be any suitable "thinners" which are oil-soluble and have the characteristic of oil-wetting the surfaces of the weighting agents employed in carrying out this invention. Examples of oil-wetting dispersing agents which may be employed in carrying out this invention are given in Table I by trade name, distributor, and chemical composition. Also given in Table I are the dispersant density and the amount of dispersant needed in pounds per final barrel to form a workable barite-in-oil plug. By workable barite-in-oil plug is meant a barite-in-oil slurry that is pumpable and has a sufficiently high density, at least 18 lb/gal and preferably about 21 lg/gal, for use in forming In accordance with this invention, when in the drilling of a well an active zone is penetrated by the well, there is formed a pumpable slurry of diesel oil, an oil-wetting dispersing agent, and barite (barite-in-oil slurry) which slurry has a density of at least about 18 lb/gal and preferably of at least about 21 lb/gal and from which the barite will settle. The slurry is circulated down a drill string in the well and into the vicinity of the active zone. The drill string is pulled upward to remove it from the slurry to prevent the drill string from becoming stuck and the slurry is maintained in position to allow the barite to settle and form a plug. Preferably, the slurry is underdisplaced by at least two barrels during placement in reference to the top of the barite plug in the annulus formed about the drill string. By underdisplacing is meant that at the time the slurry is spotted in the well in the vicinity of the active zone there remains slurry in the drill string which extends above the column of slurry in the annulus externally of the drill string. The technique of underdisplacing a slurry in a well is described in more detail in U.S. Pat. No. 3,490,535 to Messenger.

The amount of barite-in-oil slurry required to control an active zone varies with the type and pressure of the active zone. Desirably, a sufficient amount of the slurry is injected into the well to hydrostatically kill the active zone. In the alternative, a sufficient amount of slurry should be circulated into the well to fill at least 450 feet of open hole. Should the well be in communication with an overlying lost circulation zone and an underlying active zone that contains salt water it is preferred to use a sufficient amount of slurry to fill the open hole between the active zone and the lost circulation zone.

Another embodiment of this invention is directed to treating a well by placing a long, barite-in-oil plug in the well to control an active zone. By a long plug is meant a plug formed from a long column of barite-in-oil slurry placed in a well. This embodiment is particularly applicable for forming a plug to control an active zone that is overlain by a lost circulation zone in that it provides for sufficient hydrostatic pressure to be applied to control the active zone while the plug is being formed. As previously discussed, it is sometimes desirable to use an amount of barite-in-oil slurry which is sufficient to fill about 450 feet of open hole for forming a barite plug to control an active zone. Such a plug formed from about 450 feet of slurry filling an open hole may be referred to as a short plug. Short plugs are very often sufficient to control an active zone particularly when the active zone contains gas. Under other conditions, however, and particularly when the active zone contains salt water, it is desirable to form a long plug from a long column of slurry filling an open hole. It may be desirable under some conditions that the long plug be formed from slurry filling 1500 feet or more of open hole. The danger of sticking the drill string when placing a long plug in a well is substantially greater than when placing a short plug in a well. In accordance with this embodiment there is formed a first part and a second part of the barite-in-oil slurry. The first part of the barite-in-oil slurry is prepared using a sufficient amount of dispersing agent to enable the mixing and circulating of the slurry but an insufficient amount of dispersing agent to make the inert material settle. The second part of the slurry is prepared using an amount of dispersing agent which is sufficient to enable the mixing and circulating of the slurry and also sufficient to ensure that the barite will settle therefrom. The first part of the slurry is circulated down the drill pipe and up the annulus formed intermediate the drill pipe and the wellbore followed by the second part of the slurry. An underdisplacement technique may be used as previously described. Immediately after spotting the second part of the slurry the drill string is raised to a position above the uppermost location of the first part of the barite-in-oil slurry in the well. The barite from the second part of the slurry forms a barite plug while the barite in the first part of the slurry is maintained in suspension and provides increased hydrostatic pressure on the active zone while allowing the drill string to be withdrawn from the portion of the well surrounded by the first part of the slurry without the danger of the drill string being stuck by barite settling from the first part of the slurry.

Experimental work was carried out in the laboratory and is discussed below. Tests were run using one barite-Baroid, though any barite meeting API specifications could have been substituted for the barite used in these tests. A number of oil-wetting dispersants were studied and the amount of dispersant in pounds per barrel needed to form a workable barite-in-oil slurry from which an effective barite plug may be formed was determined. The tests which were run involved placing a half-barrel equivalent (175 cc) of diesel oil in each of four Hamilton Beach mixer cups. Two grams of dispersant were added to the oil in two of the cups; and one and four grams of dispersant, respectively, were added to the oil in the other two cups. These amounts of dispersants are equivalent to one, two, and four pounds per finished barrel of barite-in-oil slurry. To the cups containing 1 and 4 grams of dispersant and to one of the cups containing two grams of dispersant 700 grams of barite were added; to the other cup containing 2 grams of dispersant, 650 grams of barite were added. The equivalent densities of the barite-in-oil slurries containing 700 grams of barite were 20.8 lb/gal and the equivalent density of the barite-in-oil slurry containing 650 grams of barite was 20.2 lb/gal. The final sample volume (175 cc of diesel oil and 700 grams of barite) was about 350 cc (1 barrel equivalent). Each sample was stirred with a spatula until the barite was wet with oil and then stirred using a Hamilton Beach mixer for 1 minute at low speed. Using a Fann V.G. meter the 600 and 300 rpm readings of each sample and its plastic viscosity, yield point, and initial gel were determined. Lastly, each sample was poured into a 400-cc graduated beaker and the amount of barite settling after an hour and overnight was determined.

Without an oil-wetting dispersant it was found that only about 300 grams of barite could be added to 175 cc of diesel oil without marked increases in viscosity and gel strength and that with the addition of 400 grams of barite the mixture was pasty and unpumpable. The equivalent densities of these slurries were 15.1 and 16.8 lb/gal which densities are insufficient to form an effective barite-in-oil slurry. Further, the barite does not settle from such a slurry and thus a barite plug cannot be formed therefrom. An effective barite-in-oil slurry must contain an oil-wetting surfactant in an amount sufficient to provide for the settling of barite from the slurry to form a barite plug therefrom and to provide for sufficient barite to be included in the slurry to provide a pumpable slurry having a density of at least 18 lb/gal.

I claim:

1. In the drilling of a well having a drilling fluid therein, the method of treating said well to form a plug therein to control an active zone penetrated by said well, comprising the steps of:

forming a pumpable slurry of a light oil, a weighting agent, and an oil-wetting dispersing agent in an amount sufficient to cause said weighting agent to settle from said slurry, said slurry having a density of at least about 18 pounds per gallon;

circulating a discrete amount of said slurry down a drill string positioned in said well and into said well in the vicinity of said active zone;

raising said drill string above said slurry; and maintaining said slurry in said well in the vicinity of said active zone to form a plug of weighting agent in said well to control said active zone.

2. The method of claim 1 wherein said weighting agent is present in a sufficient amount to provide a density of said slurry of at least about 21 pounds per gallon and said oil-wetting dispersing agent is present in said slurry in an amount greater than 1 pound per barrel of slurry.

3. The method of claim 2 wherein said weighting agent is barite.

4. The method of claim 3 wherein said discrete amount of said slurry is sufficient to fill at least about 450 feet of said well.

5. The method of claim 4 wherein said light oil is diesel oil.

6. In the drilling of a well having a drilling fluid therein, said well penetrating the earth and encountering an active zone and a lost circulation zone, said active zone being located a substantial distance below said lost circulation zone, the method of treating said well to form a plug therein comprising the steps of:

forming a first part and a second part of a pumpable slurry of a light oil, an oil-wetting dispersing agent, and a weighting agent, each of said first part and said second part of said slurry having a density of at least about 18 pounds per gallon, said first part of said slurry having sufficient dispersing agent to form a pumpable slurry but insufficient dispersing agent to cause said weighting agent to settle, said second part of said slurry having an amount of dispersing agent sufficient to cause said weighting agent to settle;

injecting said first part of said slurry into a drill string positioned in said well and thereafter injecting said second part of said slurry into said drill string;

circulating said first part and said second part of said slurry down said drill string and up the annulus formed about said drill string to position said second part of said slurry in the vicinity of said lost circulation zone;

raising said drill string in said well above the upper level of said second part of said slurry; and maintaining said first part and said second part of said slurry in said well in the vicinity of said active zone to form a plug of weighting agent in said well to control said active zone.

7. The method of claim 6 wherein said weighting agent is barite and is present in a sufficient amount to provide a density of said slurry of at least about 21 pounds per gallon and wherein said first part of said slurry contains no more than about 1 pound per barrel of said dispersing agent and said second part of said slurry contains about 2 to 4 pounds per barrel of said dispersing agent.

8. The method of claim 7 wherein said weighting agent is barite, said light oil is diesel oil and wherein a sufficient amount of said second part of said slurry is circulated into said well to fill at least about 450 feet of said well.

9. In the drilling of a well having a drilling fluid therein, said well penetrating an active zone flowing salt water, the method of treating said well comprising the steps of:

forming a pumpable slurry of a light oil, a weighting agent, and an oil-wetting dispersing agent in an amount sufficient to cause said weighting agent to settle from said slurry, said slurry having a density of at least about 18 pounds per gallon;

circulating said slurry down a drill string positioned in said well and into said well in the vicinity of said active zone;

raising said drill string above said slurry; and maintaining said slurry in said well in the vicinity of said active zone to form a plug of weighting agent in said well to control the flow of salt water from said active zone into said well.

* * * * *